United States Patent [19]

Schneider

[11] 3,898,289

[45] Aug. 5, 1975

[54] HYDROXY-SUBSTITUTED AROMATIC HYDROCARBON PROCESS

[75] Inventor: Ronald Alan Schneider, Richmond, Calif.

[73] Assignee: Chevron Research Company, San Francisco, Calif.

[22] Filed: May 16, 1974

[21] Appl. No.: 470,412

Related U.S. Application Data

[63] Continuation-in-part of Ser. No. 87,310, Nov. 5, 1970, abandoned.

[52] U.S. Cl. ..... 260/621 H; 260/348 C; 260/619 F; 260/619 D; 260/624 R; 260/625; 260/626 T; 260/620
[51] Int. Cl. ............................................. C07c 37/00
[58] Field of Search ............ 260/621 H, 624 R, 620, 260/626 R, 625, 619

[56] References Cited

UNITED STATES PATENTS

| | | | |
|---|---|---|---|
| 2,439,375 | 4/1948 | Schwenk et al. | 260/621 H |
| 3,627,833 | 12/1971 | Tobias | 260/621 H |

Primary Examiner—Bernard Helfin
Assistant Examiner—W. B. Lone
Attorney, Agent, or Firm—G. F. Magdeburger; John Stoner, Jr.

[57] ABSTRACT

Hydroxy-substituted aromatic hydrocarbons are produced by contacting a cycloaliphatic oxirane compound with a Group VIII dehydrogenation catalyst at an elevated temperature.

9 Claims, No Drawings

HYDROXY-SUBSTITUTED AROMATIC HYDROCARBON PROCESS

CROSS REFERENCE TO RELATED APPLICATION

This application is a continuation-in-part of application Ser. No. 87,310, filed Nov. 5, 1970 now abandoned.

THE INVENTION

This invention relates to a novel process for the production of hydroxy-substituted aromatic compounds, more particularly to their manufacture by a catalytic dehydrogenation of a compound containing a 6-membered non-aromatic carbocyclic ring substituted by oxirane oxygen, i.e., a cyclic epoxide.

Hydroxy-substituted aromatic hydrocarbons, for example phenol, naphthols, cresols, xylenols and the like, are well known and have many uses. A new method for the preparation of these compounds is a useful advance in the art.

It has now been found that hydroxy-substituted aromatic hydrocarbons are produced by a catalyzed dehydrogenation of an unsubstituted or inertly substituted carbocyclic epoxide feed in which the oxirane oxygen is bonded to adjacent carbon atoms which are included in a 6-membered non-aromatic carbocyclic ring. The feed is contacted at an elevated temperature with a dehydrogenation catalyst which contains at least one component of Group VIII of the Periodic System of Elements. A temperature in the range 200° to 400°C., preferably 250°–350°C., is in general satisfactory.

In accordance with the present invention there is provided a process for the production of a hydroxy-substituted aromatic hydrocarbon by dehydrogenating an epoxide feed, which comprises contacting the feed with a dehydrogenation catalyst selected from the group consisting of Group VIII metals of the Periodic System of Elements, and mixtures thereof, said contacting being at a temperature in the range from about 200°–400°C., and said feed containing one or more epoxides of the formula $$(Y)_m R(X)_n$$

wherein R is a monocyclic or polycyclic, polyvalent non-aromatic hydrocarbon radical containing a 6-membered non-aromatic carbocyclic ring and having a carbon atom content in the range from six to 14 inclusive;

wherein $m$ and $n$ are integers in the range 1–2, inclusive and $m$ plus $2n$ equals the valence of R;

wherein the groups Y are the same or different non-geminal substituents selected from the group consisting of hydroxyl and monovalent hydrocarbon radicals having a carbon atom content of less than 7; and wherein X is an oxirane oxygen atom bonded to adjacent carbon atoms which are included in a 6-membered non-aromatic carbocyclic ring, said feed having a carbon atom content in the range from six to about 24.

In the process hydrogen is evolved in a reaction which may be summarized for a representative epoxide feed, 7-oxabicyclo-[4.1.0]-heptane, by the equation:

(1) $C_6H_{10}O \longrightarrow C_6H_5OH + 2H_2$ 

Thus, in the course of the reaction the oxirane oxygen functional group is converted to a hydroxyl group, and usually, where geometric isomers are possible, depending upon which of the oxirane oxygen-to-carbon bonds breaks, the resulting product mixture contains some of each possible isomer.

Unsubstituted and inertly substituted carbocyclic epoxides in which an oxirane oxygen atom is bonded to a pair of adjacent carbon atoms which are included in a 6-membered carbocyclic non-aromatic ring, are in general converted to the corresponding hydroxy-substituted aromatic hydrocarbon by the process of my invention, and these epoxides are contemplated as feeds for the present process. Preferred epoxide feeds are of the formula $R(X)_n$ in which R has a carbon atom content in the range from six to about 14 and is an unsubstituted bi- or tetra-valent carbocyclic hydrocarbon radical, in which X is an oxirane oxygen atom and $n$ is 1 or 2, i.e., an integer less than 3, and in which each of the oxirane oxygen atoms is bonded to a separate pair of adjacent carbon atoms included in a 6-membered carbo-cyclic ring; and of these, the carbocyclic epoxides which contain only 6-membered rings are more preferable feeds, while those containing only a single carbocyclic ring are most preferable.

By an unsubstituted carbocyclic hydrocarbon radical, as used herein, is meant by definition that all of the carbon-carbon chemical bonds of the radical are ring-forming bonds, i.e., are part of a closed chain of carbon atoms, and that the hydro-carbon radical portion of the molecule contains separate unsatisfied valences. In the present circumstances these valences are satisfied by bonding to oxygen (cf. the formula above) and to inert substituent groups.

By oxirane oxygen is meant oxygen as in the ethylene oxide heterocyclic functional group, i.e.,

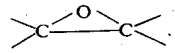

Inertly substituted carbocyclic epoxides are also satisfactory feeds for the instant process and are contemplated for this use. Preferably one or two, i.e., less than three, non-geminal ring hydrogen atoms, (i.e., hydrogen bonded to carbocyclic carbon) are replaced by inert substituent groups.

Hydroxyl groups, including enol-hydroxyl as from enolization of a ring carbonyl functional group, i.e., of a ketonic oxygen, and hydrocarbon groups in general, preferably hydrocarbon groups containing less than seven carbon atoms, are inert substituent groups. Substituted carbocyclic epoxides having a carbon atom content of less than about 24 and one or two, i.e., less than three, hydroxyl substituent groups are preferred process feeds.

Individual carbocyclic epoxide compounds or mixtures of these compounds may be employed as feeds for the process of the invention. The contacting may be effected with the feed in the liquid or vapor states, i.e., with the feed in a fluid state, and may be accomplished in the presence of inert diluents, such as hydrocarbons, and inert gases such as nitrogen, carbon dioxide, hydrogen, and the like. Although hydrogen gas is produced in the reaction, the addition of hydrogen to the feed during the contacting appears to be beneficial and to promote the desired conversion of epoxide feed to hydroxy aromatic product.

The aromatization of the present carbocyclic epoxide feeds takes place readily, particularly at temperatures above about 280°C.–300°C., in the presence of elements of Group VIII of the Periodic System of Elements (cf. Encyclopedia of Chemical Technology, Volume V, Kirk-Othmer, Interscience Publishing Co., 1950, Page 672). Thus, these elements and their component mixtures, as known in the organic hydrogenation-dehydrogenation art, are in general useful in the present process (cf. "Catalysis", Beckman, Morrell & Egloff, Rheinhold Publishing Co., 1940.) The group which includes nickel, palladium and platinum is preferred because of the generally substantial catalytic activities of catalysts in which they are a component.

Representative catalysts useful for the present process include supported and unsupported metals of Group VIII, as noted above, particularly the colloidal metals, and the metals supported on carbon black, cotton, asbestos, kieselguhr, pumice, silica, alumina and the like materials; platinum black, nickel, Raney nickel, palladium, ruthenium, cobalt, iron, nickel on silica, nickel-tin on silica, nickel-copper-chromium, nickel-palladium on alumina or pumice, rhodium, osmium, iridium, platinum-tin disposed on alumina; iron, cobalt and nickel promoted by thoria, titania and the like metal oxides; and the like hydrogenation-dehydrogenation catalysts.

The carbocyclic epoxide compounds employed as feeds herein are in general known in the art and obtainable by several known methods. Briefly, a convenient method of preparation is by the reaction of an organic hydroperoxide, for example t-butyl hydroperoxide, with a carbocyclic olefin, for example cyclohexene, in the presence of a suitable catalyst, for example a soluble vanadium compound (cf. U.S. Pat. No. 3,350,422).

In a preferred embodiment cyclohexene oxide (7-oxabicyclo [4.1.0]heptane) is contacted with a platinum hydrogenation-dehydrogenation catalyst, platinum disposed upon carbon. The vaporized oxide feed is contacted with the catalyst at a temperature of about 350°C. and a weight hourly space velocity of about 3 hours$^{-1}$. The conversion of the epoxide is about 95% and the yield of phenol exceeds 90%.

The pressure at which the dehydrogenation is carried out is not a primary variable and may be atmospheric, or sub- or superatmospheric. For those feeds having boiling points below the contact temperature, the contacting of the catalyst with the feed in the vapor phase is generally preferable in order to avoid the superatmospheric pressures which would otherwise be required in order to maintain the feed in the liquid phase. On the other hand, where the feed is a relatively high boiling material and it is desired to employ the vapor phase method, the use of subatmospheric pressures facilitates the vaporization of the feed.

With respect to contact times satisfactory for use herein, the useful range is broad and the usual time-temperature relationships apply. That is, as the temperature is increased, the contact time may be shortened. In general, liquid hourly space velocities in the range 0.1 to 10 hours.$^{-1}$, preferably 0.5 to 5 hrs.$^{-1}$, are inclusive of desirable values.

Other examples of useful unsubstituted carbocyclic epoxide feed compounds include the mono- and diepoxides of the hydroaromatic hydrocarbons corresponding to benzene, naphthalene, indene, fluorene, anthracene, phenanthrene; for example, tetrahydrobenzene oxide (i.e., cyclohexene oxide), dihydrobenzene mono- and diepoxides (i.e., 1,3- and 1,4- cyclohexadiene mono- and diepoxides), the mono- and diepoxides of di-, tetra-, hexa-, and octahydronaphthalene, and similarly the mono- and diepoxides of hydroaryl hydrocarbons of three or more carbocyclic rings. Of the fused ring unsubstituted carbocyclic epoxide feeds, those containing rings having carbon atom content in the range five–six are preferred process feeds. Yet additional examples of useful unsubstituted carbocyclic epoxide feeds and hydroxy aromatic products are listed in the following Table I:

TABLE I

EPOXIDE FEED$^{(1)}$ = PRODUCT

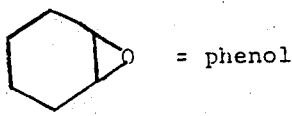 = phenol

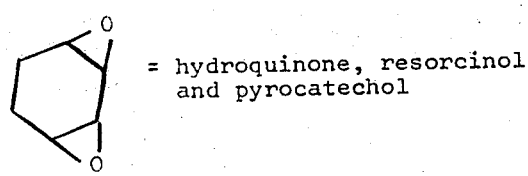 = hydroquinone, resorcinol and pyrocatechol

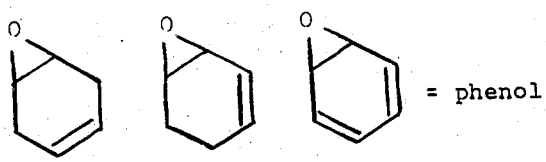 = phenol

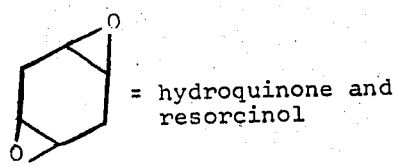 = hydroquinone and resorcinol

TABLE I (Continued)
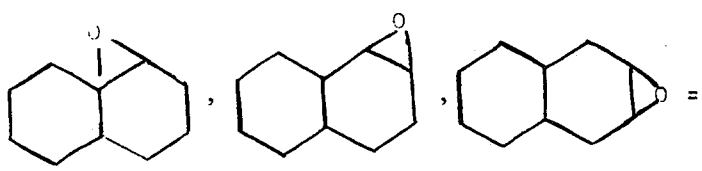
α- and/or β-naphthol
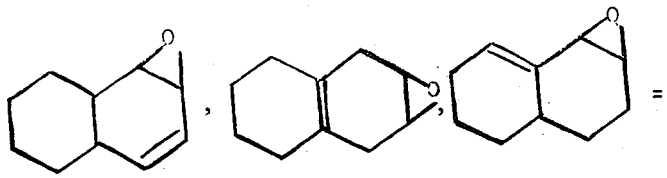
α- and/or β-naphthol
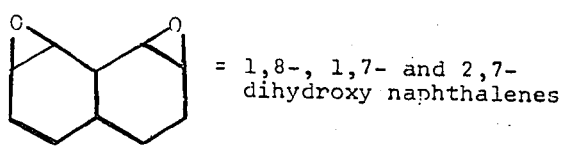
= 1,8-, 1,7- and 2,7-
dihydroxy naphthalenes
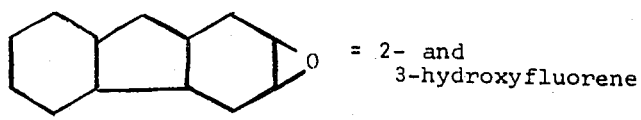
= 2- and
3-hydroxyfluorene
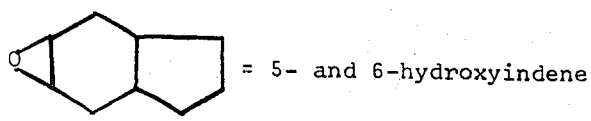
= 5- and 6-hydroxyindene
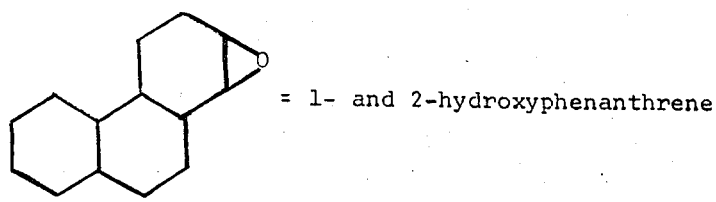
= 1- and 2-hydroxyphenanthrene
(1) Carbocyclic rings are non-aromatic
Examples of useful substituted carbocyclic epoxide feed compounds and hydroxy aromatic products are listed in Table II following.

TABLE II
| FEED(1) | COMPOUND |
|---|---|
| 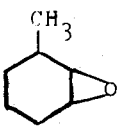 | o-, and m-cresol |
|  | o-cresol |
| 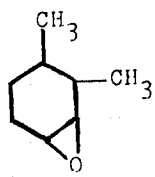 | 2,3-, and 3,4-xylenol |
| 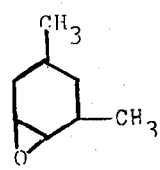 | 2,4-, and 3,5-xylenol |
|  | m- and p-phenylphenol |
| 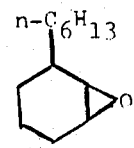 | o- and m-n-hexylphenol |
| 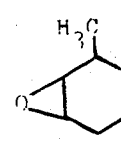 | 2,6-, 2,7-, and 3,6-dihydroxy-1,8-dimethylnaphthalene |
| 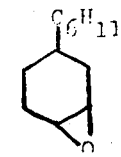 | m-, and p-cyclohexyl phenol and m-, and p-phenylphenol |
| 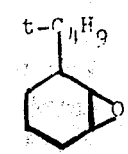 | o-, and m-t-butylphenol |

TABLE II (Continued)
| FEED[1] | COMPOUND |
|---|---|
| 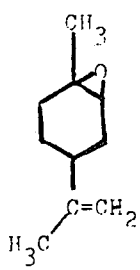 | 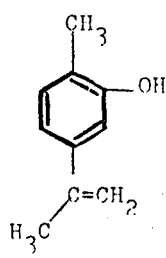 |
| 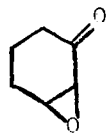 | pyrocatechol and resorcinol |
| 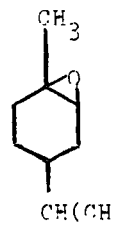 | 2-isopropyl, 6-methylphenol |
| 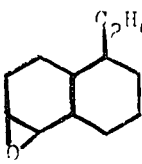 | 1-ethyl-5-hydroxy-, and 1-ethyl-6-hydroxynaphthalene |
| FEED[1] | COMPOUND |
|---|---|
| 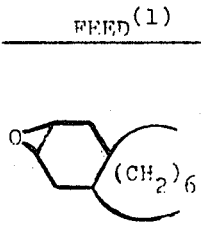 | 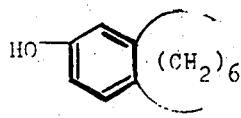 |
| 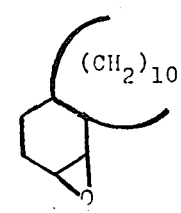 | 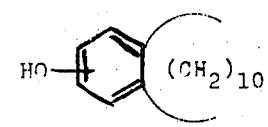 |
| 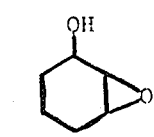 | pyrocatechol and resorcinol |
| 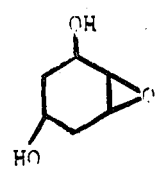 | 1,3,5- and 1,2,5-trihydroxybenzene |
(1) Carbocyclic rings are non-aromatic The following examples further illustrate the invention.

EXAMPLES 1–2

A reaction tube was packed with glass wool on which was supported 5% platinum on carbon. Cyclohexene oxide vapor was passed over the catalyst without added hydrogen at 346°C. with a weight hourly space velocity of 3 hrs.$^{-1}$. Conversion was 96%. Products (and yields in mole percent) were phenol (92%), benzene (4.8%), cyclohexanone (2.7%), and cyclohexanol (1.0%). Of the side products, the cyclohexanone and cyclohexanol could be recycled.

The experiment was repeated at 298°C. Conversion was 57%, and the yield of phenol was 72%. The yield of cyclohexanoneol mixture was 26%.

EXAMPLES 3–6

Cis-7-oxabicyclo[4.1.0]heptan-2-ol vapor was passed through the catalyst tube of Example 1 (WHSV = 3 hrs.$^{-1}$) at the temperatures and flow rates of added hydrogen shown in Table III below, which also gives the conversion, percent yields of dihydric phenols, and product distribution of each run as determined by vapor-phase chromatographic analysis using appropriate standards.

TABLE III

PRODUCT DISTRIBUTION

| No. | Temp., °C. | H₂ Flow Rate, Ft³/Hr. | Benzene | Cyclohexene Oxide | Cyclohexanone | Cyclohexanol | cis-7-Oxabicyclo [4.1.0] heptan-2-ol | Phenol | Pyrocatechol | Resorcinol | Other | Conversion |
|-----|------------|-----------------------|---------|-------------------|---------------|--------------|--------------------------------------|--------|--------------|------------|-------|------------|
| 3   | 351        | 0                     | 10      | 23                | 3             | —            | —                                    | 57     | 5            | 2          | —     | 100        |
| 4   | 351        | 0.12                  | 12      | 13                | 2             | 2            | 1                                    | 53     | 8            | 8          | —     | 99         |
| 5   | 353        | 0.70                  | 9       | 11                | 3             | 4            | 4                                    | 49     | 10           | 10         | 1     | 96         |
| 6   | 309        | 0.70                  | 2       | 3                 | 3             | 5            | 33                                   | 17     | 14           | 7          | 16    | 67         |

The above examples demonstrate that unsubstituted and inertly substituted epoxides in which oxirane oxygen is bonded to carbon included in a 6-membered carbocyclic ring are converted to hydroxy substituted aromatic hydrocarbons.

As will be evident to those skilled in the art, numerous modifications in this process can be made or followed, having in mind the foregoing disclosure and discussion without departing from the spirit or scope of the disclosure or from the scope of the following claims.

What is claimed is:

1. The process for the production of a hydroxysubstituted aromatic hydrocarbon by dehydrogenating an epoxide feed, which comprises contacting the feed with a dehydrogenation catalyst selected from the group consisting of Group VIII metals of the Periodic System of Elements, and mixtures thereof, said contacting being at a temperature in the range from about 200°–400°C., and said feed containing one or more epoxides of the formula $$(Y)_m R(X)_n$$

wherein R is a monocyclic or polycyclic, polyvalent nonaromatic hydrocarbon radical containing a 6-membered non-aromatic carbocyclic ring and having a carbon atom content in the range from six to 14 inclusive;

wherein m and n are integers in the range 1–2, inclusive and m plus 2n equals the valence of R;

wherein the groups Y are the same or different non-geminal substituents selected from the group consisting of hydroxyl and monovalent hydrocarbon radicals having a carbon atom content of less than seven; and wherein X is an oxirane oxygen atom bonded to adjacent carbon atoms which are included in a 6-membered non-aromatic carbocyclic ring, said feed having a carbon atom content in the range from six to about 24.

2. The process as in claim 1 wherein the temperature is in the range from about 250° to 350°C., the Group VIII component is selected from the group consisting of nickel, palladium and platinum, and the epoxide contains carbocyclic rings having a carbon atom content in the range 5 to 6, inclusive.

3. The process as in claim 1 wherein the contacting is carried out in the presence of added hydrogen gas.

4. The process as in claim 1 wherein said catalyst is platinum disposed upon carbon.

5. The process as in claim 1 wherein said catalyst is metal in the colloidal form.

6. The process as in claim 1 wherein said catalyst is metal disposed on an inert support.

7. The process for the production of a hydroxy-substituted aromatic hydrocarbon by dehydrogenating an epoxide feed, which comprises contacting the feed with a dehydrogenation catalyst containing at least one component of Group VIII metal of the Periodic System of Elements, said contacting being at a temperature in the range from about 200°–400°C., said feed containing one or more epoxides of the formula R(X)$_n$, wherein R is an unsubstituted or hydrocarbyl- or hydroxyl-substituted bi- or tetravalent non-aromatic carbocyclic hydrocarbon radical containing only a single 6-membered non-aromatic carbocyclic ring and having a carbon atom content in the range from six to 14, inclusive, n is an integer which is less than 3 and X is an oxirane oxygen atom bonded to adjacent carbon atoms which are included in a 6-membered non-aromatic carbocyclic ring.

8. The process for the production of phenol which comprises contacting cyclohexane oxide with platinum disposed upon carbon, said contacting being at a temperature of about 350°C.

9. The process for the production of pyrocatechol and resorcinol which comprises contacting cis-7-oxabicyclo [4.1.0]heptan-2-ol with platinum dispersed upon carbon, said contacting being at a temperature of about 350°C.

* * * * *